(12) United States Patent
Dogterom et al.

(10) Patent No.: US 7,790,648 B2
(45) Date of Patent: Sep. 7, 2010

(54) PROCESS FOR PREPARING A CATALYST

(75) Inventors: Ronald Jan Dogterom, Amsterdam (NL); Robert Martijn Van Hardeveld, Rotterdam (NL); Marinus Johannes Reynhout, Amsterdam (NL); Bastiaan Anton Van De Werff, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/793,671

(22) PCT Filed: Dec. 21, 2005

(86) PCT No.: PCT/EP2005/057015

§ 371 (c)(1),
(2), (4) Date: Jun. 21, 2007

(87) PCT Pub. No.: WO2006/067177

PCT Pub. Date: Jun. 29, 2006

(65) Prior Publication Data

US 2008/0114084 A1  May 15, 2008

(30) Foreign Application Priority Data

Dec. 23, 2004  (EP) .................................. 04106957

(51) Int. Cl.
*B01J 31/00* (2006.01)
*B01J 23/00* (2006.01)
*B01J 21/00* (2006.01)
*B01J 20/00* (2006.01)

(52) U.S. Cl. ........................ 502/150; 502/258; 502/259; 502/260; 502/261; 502/262; 502/324; 502/326; 502/327; 502/332; 502/333; 502/334; 502/335; 502/336; 502/337; 502/338; 502/339; 502/349; 502/350; 502/355; 502/415; 502/439

(58) Field of Classification Search ................. 502/258, 502/259, 260, 261, 262, 324, 326, 327, 332, 502/333, 334, 335, 336, 337, 338, 339, 349, 502/350, 355, 415, 439, 150
See application file for complete search history.

(56) References Cited

U.S. PATENT DOCUMENTS

| 3,787,332 | A | * | 1/1974 | Sugier ........................ 502/178 |
| 4,595,703 | A | | 6/1986 | Payne et al. ................. 518/715 |
| 5,200,381 | A | * | 4/1993 | Kamo ........................ 502/170 |
| 5,248,701 | A | | 9/1993 | Soled et al. ................. 518/700 |
| 5,863,856 | A | | 1/1999 | Mauldin ..................... 502/325 |
| 2003/0130361 | A1 | | 7/2003 | Lednor et al. ............... 518/715 |
| 2003/0166451 | A1 | | 9/2003 | Koveal et al. ................. 502/38 |

FOREIGN PATENT DOCUMENTS

| WO | WO9700231 | 1/1997 |
| WO | WO9934917 | 7/1999 |

* cited by examiner

*Primary Examiner*—Cam N Nguyen

(57) ABSTRACT

The invention relates to a process for preparing a catalyst. The process allows the delamination of layered crystals which are used as a starting material for a catalyst. The starting material is subsequently converted into an active portion of a catalyst with an increased dispersion resulting in a higher activity. Preferred delaminating agents are di-carboxylic acids and one particular example is citric acid. Preferably at least 0.75 wt %, more preferably at least 1.5 wt % of a delaminating agent is added to the catalyst starting material.

19 Claims, No Drawings

PROCESS FOR PREPARING A CATALYST

The present application claims priority to European Patent Application 04106957.6 filed 23 Dec. 2004.

FIELD OF THE INVENTION

This invention relates to a process for preparing a catalyst particularly for use in a Fisher-Tropsch process.

BACKGROUND OF THE INVENTION

The Fischer Tropsch process can be used for the conversion of hydrocarbonaceous feed stocks into liquid and/or solid hydrocarbons. The feed stock (e.g. natural gas, associated gas and/or coal-bed methane, residual oil fractions, biomass and coal) is converted in a first step into a mixture of hydrogen and carbon monoxide (this mixture is often referred to as synthesis gas or syngas). The synthesis gas is then fed into a reactor where it is converted over a suitable catalyst at elevated temperature and pressure into paraffinic compounds ranging from methane to high molecular weight modules comprising up to 200 carbon atoms, or, under particular circumstances, even more.

Catalysts used in the Fischer-Tropsch synthesis often comprise a refractory oxide based support material, especially titania, and one or more metals from Group VIII of the Periodic Table, especially from the iron group, optionally in combination with one or more metal oxides an/or metals as promoters. Particular interest has been given to catalysts comprising cobalt as the catalytically active component, in combination with one or more promoters selected from zirconium, rhenium, chromium, vanadium, platinum and manganese, especially manganese. Such catalysts are known in the art and have been described for example, in the specifications of International Patent Application No. WO A-9700231 and United States Patent publication No. U.S. Pat. No. 4,595,703.

Catalysts can be prepared by obtaining a metal hydroxide, carefully oxidising it to the metal oxide and then placing it in the appropriate reactor where it is reduced to the metal in situ.

One catalyst for Fischer-Tropsch reactions is cobalt on titania. To prepare the catalyst, cobalt hydroxide ($Co(OH)_2$) can be used as a starting material. This material is mixed with the carrier, dried, calcined and then decomposed to form cobalt oxide (CoO). The cobalt is further oxidised ($Co_3O_4$) and then placed in a Fischer-Tropsch reactor. In the reactor the cobalt oxide is reduced to cobalt.

It is known to use a "peptising agent" in the preparation of catalysts or catalyst precursors. The peptising agent may dissolve small amounts of the constituents and may separate any agglomerated crystals. Agglomerated crystals include any loosely bonded crystals, but do not include any highly bonded crystals, grown crystals or single crystals.

It is preferred not to add any excess of the peptising agent because too much organic material present in the sample during calcination can cause problems and can lead to uncontrolled partial reduction of cobalt hydroxide to cobalt titanate, thus reducing the activity of the catalyst. Thus it has generally been regarded that the maximum amount of peptising agent that should be added to a catalyst starting material, such as cobalt hydroxide, is 0.75 wt %.

SUMMARY OF THE INVENTION

According to a first aspect of the present invention, there is provided a process for the preparation of a metal-containing catalyst or catalyst precursor, comprising:

(a) mixing (1) a carrier or a carrier precursor, (2) a liquid, and (3) a metal compound which is at least partially insoluble in the amount of liquid used, to form a mixture,
(b) shaping and drying of the mixture thus obtained, and
(c) calcination of the composition thus obtained, the process comprising adding more than 0.75 wt % based on the mixture of a delaminating agent to the catalyst starting mixture.

Preferably 1 wt % or more than 1 wt % of the delaminating agent is added to the catalyst starting material.

Preferably 1.5 wt % or more than 1.5 wt % of the delaminating agent is added to the catalyst starting material.

Preferably 2 wt % or more than 2 wt % of the delaminating agent is added to the catalyst starting material.

Optionally 5 wt % or more than 5 wt % of the delaminating agent is added to the catalyst starting material.

In certain embodiments up to 15 wt %, preferably up to 10 wt % of the delaminating agent is added to the catalyst starting material.

DETAILED DESCRIPTION OF THE INVENTION

The present invention proceeds contrary to the art by adding more organic material to the catalyst starting material than previously taught. This is because the organic material not only causes the agglomerated crystals to separate, but has now also been found to delaminate the individual crystals, thus providing a greater dispersion, greater surface area and a consequential increase in the final catalyst activity.

The invention especially concerns a process for the preparation of catalysts as described above wherein at least 50 wt % of the metal compound, preferably a cobalt compound, is insoluble in the amount of liquid used, preferably at least 70 wt %, more preferably at least 90 wt %, still more preferably at least 96 wt %.

The catalyst starting material can be any material used in the production of a catalyst and which includes the catalytically active material, for example certain metals. The catalyst starting material is typically a metal powder, a metal hydroxide or a metal oxide, preferably metallic cobalt powder, cobalt hydroxide or an cobalt oxide, more preferably $Co(OH)_2$, CO(OH) or $Co_3O_4$.

The invention can be used for various active portions of catalysts, particularly those with a layered structure or brucite-like structure and typically their starting materials, including cobalt hydroxide, cobalt oxide hydroxide, nickel hydroxide, and magnesia, or other metal hydroxides or mixtures thereof.

The delaminating agent may be any species capable of bonding to more than one layer of a crystal. The delaminating agent may be a carboxylic acid, preferably a di-carboxylic acid.

Other delaminating agents include mono-carboxylic acids which can bond to one crystal layer by way of its carboxylate group and the opposite crystal layer by way of a carbon atom attaching to a hydroxyl group in the catalyst starting material. Carboxylate acid derivatives may also be used, such as $CO(NH_2)$-based and CS(OH)-based compounds, although sulphur containing compounds are less preferred.

The di-carboxylic acids can have any length of carbon chain. Preferably the di-carboxylic acids have chains of between 2-20 carbon atoms, more preferably between 6-10 carbon atoms.

Where mono-carboxylic acids are used, preferably they comprise chains of around 10 carbon atoms.

Optionally other functional groups may be present in the carbon chains, such as aldehyde groups. Poly-carboxylic acids may also be used.

Delaminating agents can include basic and acidic compounds. Examples of suitable acidic delaminating agents include L-aspartic acid, acetic acid, formic acid, citric acid, oxalic acid and propionic acid.

Examples of basic compounds are ammonia, ammonia-releasing compounds and preferably ammonium compounds or organic amines, more preferably ethanol amine.

In order to cope with the addition of organic material, certain embodiments of the invention involve increasing the oxygen concentration during calcination in order to replenish the oxygen consumed by combustion of the organic material. Alternatively smaller catalyst extrudates or a thin-layer catalyst may be used.

Thus embodiments of the present invention allow a greater dispersion of the catalytically active material. Following the activation of the catalyst, the active metal particles are more greatly dispersed, resulting in a finer particle size which in turn increases activity. Preferably X-ray diffraction is used to analyse the crystal structures. Transmission Electron Microscopy (TEM) can be used to analyse improvement in dispersion of the layered crystals into the crystals of a support membrane.

Preferably the catalyst starting material is dried, calcined and prepared for use as a catalyst. For example it may be oxidised and then reduced to the metal in situ.

The present invention also provides a catalyst or catalyst starting material whenever prepared by a process as herein defined.

In the process of the invention the cobalt compound is suitably used in an amount of up to 60 weight percent of the amount of refractory oxide, preferably between 10 and 40 wt percent.

In the process of the invention the catalyst or catalyst precursor comprises at least one promoter metal, preferably manganese, vanadium, rhenium, ruthenium, zirconium, titanium or chromium, most preferably manganese, the promoter metal(s) preferably used in such an amount that the atomic ratio of metal, especially cobalt, and promoter metal is at least 4, preferably at least 5, preferably wherein the promoter metal compound is present in step (a).

In the process of the invention the mixing step (a) is performed by kneading or mulling and the mixture thus obtained is shaped by palletising, extrusion, granulating or crushing, preferably by extrusion, more preferably wherein the mixture obtained has a solids content in the range of from 30 to 90% by weight, preferably of from 50 to 80% by weight.

According to a further aspect of the invention, there is provided a process for the preparation of a catalyst or catalyst precursor, comprising the steps of;
(a) admixing to form a mixture:
 (1) a porous refractory oxide or a precursor of a porous refractory oxide,
 (2) a compound which is or is capable of forming a layered structure,
 (3) more than 0.75 wt % of a delaminating material;
(b) extruding, shaping and drying of the mixture thus obtained;
(c) calcining the product of step (b).

Typically a liquid is added to the mixture. Preferably the liquid is added to the mixture after step (a) and before or during step (b). Thus the porous refractory oxide, the compound which is or is capable of forming a layered structure, and the delaminating material are preferably dry-mixed before the liquid is added. Once liquid is added they are then preferably extruded.

Typically the layered structure is a brucite-like structure.

Typically the compound which is or is capable of forming a layered structure is at least partially insoluble in the amount of liquid used.

The liquid may be any of suitable liquids known in the art, for example water; ammonia; alcohols, such as methanol, ethanol and propanol; ketones, such as acetone; aldehydes, such as propanal and aromatic solvents, such as toluene, and mixtures of the aforesaid liquids. A most convenient and preferred liquid is water.

The liquid may include viscosity improvers such as polyvinylalcohol.

The delaminating agent is preferably added as a solid or in encapsulated form. The delaminating agent thus becomes active under a condition when high shear fields occur. Although the delaminating agent may be added at any time before calcination, preferably therefore the delaminating agent is added immediately before the extrusion step when the shear force is relatively high.

In particular, when dry-mixed, the ingredients (1), (2) and (3) can typically be mixed together at the same time but where mixed in liquid, preferably the ingredients (1) and (2) are admixed prior to the addition of the ingredient (3).

Preferably the shear force when the delaminating agent is added is at least 100 kJ per kilo, preferably around 500 kJ per kilo and optionally up to 1000 kJ per kilo, or up to 2000 kJ per kilo, or even more.

More preferably the delaminating agent is added when the temperature of the mixture is relatively high, that is above about 70° C. preferably above about 80° C.

The high shear forces and temperature encourage the delaminating agent to act as such (i.e. delaminate the crystals) rather than absorbing on the support, for example $TiO_2$, or chemically reacting with the crystals, for example $Co(OH)_2$.

The crystals are preferably delaminated so that their size decreases from around 20 nm to between 5 and 10 nm.

One example of a porous refractory oxide is titania.

The compound which is or is capable of forming a layered structure can comprise cobalt, cobalt/manganese or iron.

Preferably the catalyst starting material is or provides a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_{5+}$ hydrocarbons is at least 60 wt % by weight of the total product, more preferably, at least 70 wt % by weight, even more preferably, at least 80 wt % by weight, most preferably at least 85 wt % by weight. Reaction products which are liquid phase under reaction conditions may be separated and removed using suitable means, such as one or more filters. Internal or external filters, or a combination of both, may be employed. Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts.

The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ratio is in the range from 1.0 to 2.5.

The gaseous hourly space velocity may very within wide ranges and is typically in the range from 1500 to 10000 Nl/l/h, preferably in the range from 2500 to 7500 Nl/l/h.

Embodiments of the present invention will now be described by way of example only.

A known catalyst comprises about 80 wt % titania and 20 wt % cobalt oxide with a surface area of 40 $m^2/g$. The 80 wt % titania contributes 32 $m^2/g$ to this overall surface area and the 20 wt % cobalt contributes 8 $m^2/g$ to this overall surface area.

In one example, after including a delaminating agent (citric acid, 2 wt %) in accordance with the present invention, the surface area increased to 44 $m^2/g$. It should be noted that there is no increase in the surface area of the titania but rather the increase is due to the increased surface area of the cobalt oxide. Thus when the overall surface area increases to 44 $m^2/g$, it is the cobalt surface area which increases from 8 $m^2/g$ in the mixture to 12 $m^2/g$ in the mixture, that is by 50 wt %, since the surface area of the titania remains constant.

In the Fischer-Tropsch reaction the second catalyst showed an improved activity (STY 164 vs. 139 g/heat/h) and an improved selectivity (91.0 vs. 88.4% $C_{5+}$-selectivity).

What is claimed is:

1. A process for the preparation of a metal-containing catalyst or catalyst precursor, comprising:
   (a) mixing (1) a carrier or a carrier precursor, (2) a liquid, and (3) a metal compound which is at least partially insoluble in the amount of liquid used, to form a mixture,
   (b) shaping and drying the mixture thus obtained, and
   (c) calcining the composition thus obtained, the process further comprising adding more than 0.75 wt % based on the mixture of a delaminating agent to the mixture of step (a).

2. A process as claimed in claim 1, wherein more than 2 wt % of the delaminating agent is added to the mixture of step (a).

3. A process as claimed in claim 2, wherein the delaminating agent is added in an amount less then 15 wt %.

4. A process according to claim 1 wherein at least 50 wt % of the metal compound is insoluble in the amount of liquid used.

5. A process as claimed in claim 1, wherein the catalyst starting material metal compound is a metal powder, a metal hydroxide or a metal oxide.

6. A process as claimed in claim 1, wherein the delaminating agent comprises at least one carboxylic acid group.

7. A process according to claim 1, wherein the carrier or carrier precursor comprises a refractory oxide and the metal compound comprises a cobalt compound and is used in an amount of up to 60 weight percent of the amount of refractory oxide.

8. A process according to claim 1, wherein the catalyst or catalyst precursor comprises at least one promoter metal and the promoter metal is used in such an amount that the atomic ratio of metal, and promoter metal is at least 4.

9. A process according to claim 1, wherein the mixing step (a) is performed by kneading or mulling and the mixture thus obtained is shaped by pelletizing, extrusion, granulating or crushing.

10. A process as claimed in claim 1, wherein in the mixing step (a) a resultant shear force applied to the mixture is between 100-1000 kJ per kilo.

11. A process as claimed in claim 10, wherein the shear force is between 250-750 kJ per kilo.

12. A process as claimed in claim 1, wherein during admixing of ingredients (1), (2) and (3), the temperature is greater than 70° C.

13. A process as claimed in claim 1, wherein the carrier or carrier precursor comprises titania.

14. A process as claimed in claim 1, wherein the metal compound which is or is capable of forming a layered structure is selected from the group consisting of compounds of cobalt, cobalt/manganese and iron.

15. A process as claimed in claim 1, wherein at least 90% of the metal compound is insoluble in the amount of liquid used.

16. A process as claimed in claim 1, wherein at least 96% of the metal compound is insoluble in the amount of liquid used.

17. A process as claimed in claim 1, wherein the delaminating agent comprises a carboxylic acid group having a carbon chain of between 6-10 carbon atoms.

18. A process as claimed in claim 1, wherein the mixture of step (a) has a solids content of from 50 to 80% by weight.

19. A catalyst or catalyst starting material comprising delaminated crystals prepared by a process as claimed in claim 1.

* * * * *